(12) United States Patent
Kaelin

(10) Patent No.: US 6,487,143 B1
(45) Date of Patent: Nov. 26, 2002

(54) ELECTROLUMINESCENT LIGHTING DEVICE FOR A DIAL

(75) Inventor: Laurent Kaelin, Sonvilier (CH)

(73) Assignee: Eta SA Fabriques d' Ebauches (CH)

( * ) Notice: Subject to any disclaimer, the term of this patent is extended or adjusted under 35 U.S.C. 154(b) by 0 days.

(21) Appl. No.: 09/661,933

(22) Filed: Sep. 14, 2000

(30) Foreign Application Priority Data

Oct. 19, 1999 (CH) .............................................. 1905/99

(51) Int. Cl.[7] .......................... G04B 19/30; G01D 11/28
(52) U.S. Cl. .......................... 368/227; 368/67; 362/23; 362/31
(58) Field of Search .......................... 368/10, 67, 227, 368/296; 362/23, 31

(56) References Cited

U.S. PATENT DOCUMENTS

| | | | |
|---|---|---|---|
| 2,974,474 A | * 3/1961 | Wegner | 368/67 |
| 3,748,456 A | * 7/1973 | Brien | 368/67 |
| 4,004,410 A | * 1/1977 | Kawamata | 368/291 |
| 4,250,575 A | 2/1981 | Flumm | |
| 4,297,681 A | * 10/1981 | Dircksen | 362/23 |
| 4,705,407 A | * 11/1987 | Brien | 368/67 |
| 4,775,964 A | * 10/1988 | Thorgersen et sl. | 368/67 |
| 4,908,739 A | * 3/1990 | Brien | 368/67 |
| 5,265,071 A | * 11/1993 | Alessio et al. | 368/67 |
| 5,564,812 A | * 10/1996 | Berardi | 362/23 |
| 5,984,485 A | * 11/1999 | Poli et al. | 368/26 |
| 6,082,867 A | * 7/2000 | Chien | 368/67 |
| 6,298,013 B1 | * 10/2001 | Berlin et al. | 368/10 |

FOREIGN PATENT DOCUMENTS

EP 0 860 755 A1 8/1998

OTHER PUBLICATIONS

Moser, Signal or measuring display with electroluminescent illumination, DE4023693, Mar. 1991, abstract.*
Mitsuharu et al., Electroluminscene character display board, JP2177290, Jul. 1990. abstract.*
Koji et al., EL element and clock, JP5182761, Jul. 1993, abstract.*

* cited by examiner

Primary Examiner—David Martin
Assistant Examiner—Jeanne-Marguerite Goodwin
(74) Attorney, Agent, or Firm—Richard K. Robinson

(57) ABSTRACT

Peripheral lighting device for the scale of a dial (11) of an apparatus of small dimensions including a case (1) in which are housed a movement (14) driving at least one hand (12a, 12b, 12c) with respect to the scale, a power source (6) and an electronic circuit (15) able to supply a pulsed voltage, said case being closed by crystal (4) extended on the dial side by an annular extension forming a flange (17), characterized in that a circular recess (19) is provided inside the base (18) of the flange (17) to accommodate on the one hand, an electroluminescent ring (20) formed of a strip having a border (21) extending beyond the base and a connecting lug (22), and on the other hand a ring (30) made of translucent plastic material forced into the annular recess (19) to hold the electroluminescent ring (20) at the bottom thereof.

5 Claims, 3 Drawing Sheets

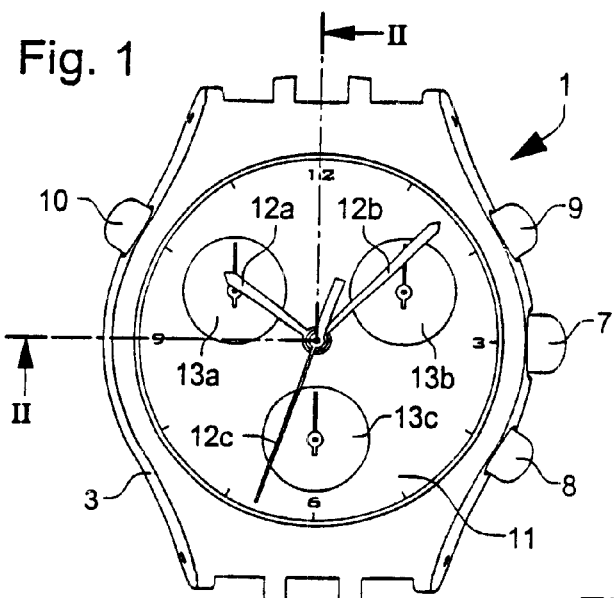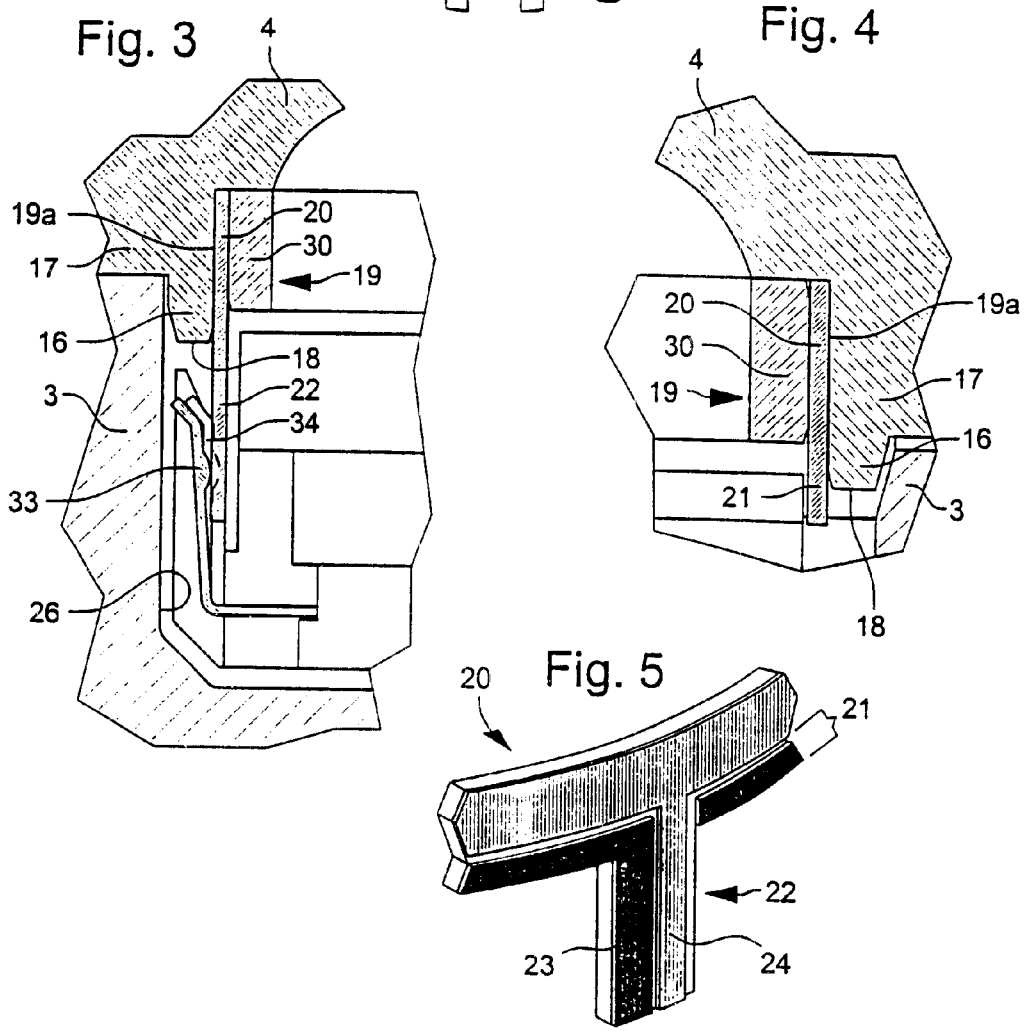

ELECTROLUMINESCENT LIGHTING DEVICE FOR A DIAL

BACKGROUND OF THE INVENTION

The present invention concerns an electroluminescent lighting device for a dial, and more particularly for a circular dial of an apparatus of small dimensions with an autonomous power source, such as a timepiece to allow the time symbols situated at the periphery of the dial to be read at night.

DESCRIPTION OF THE RELATED ART

The use of electroluminescent panel or lamp for lighting a dial at night is well known. In U.S. Pat. No. 4,775,964, an electroluminescent sheet is cut to the dimensions of the dial of a wristwatch, pierced with a hole at its centre for the passage of the shaft of the hands, provided with time symbols by printing or screen printing on the face turned towards the observer and connected, by flexible connectors bonded to each electrode of the electroluminescent sheet, to an electronic circuit provided to supply an appropriated pulsed voltage. The improvements described in U.S. Pat. No. 5,265,071 essentially concern simplification of the connection means which are then formed by a tongue, which may or may not be bent, and of which an exposed portion of electrode is coated with a conductive ink to avoid or compensate for any cracks in the electrode in order to establish at least one contact with the printed circuit. Such a construction offers the advantage of being relatively simple to implement. However it has the drawback of still having a high power consumption, because of the size of the surface covered, despite the progress made as regards the design of the electroluminescent films and excitation circuits, and of restricting the possible aesthetic variations in the dial, which are very often desired by designers to differentiate their products from those of competitors.

In order to reduce power consumption, it is of course possible to reduce the surface of the electroluminescent sheet for example by limiting the surface thereof around the time symbols, as described in German Patent No. 4 023 693, or conversely, by cutting openings in its surface representing said time symbols, as described in Japanese Patent No. A-02-177290, which complicates the mounting of the electroluminescent elements on the dial. Moreover, in order to have a certain aesthetic appearance, the use of several electroluminescent sheets of different colours has also been proposed, for example cut into concentric sectors or rings, as described in Japanese Patent No. A-05-182761. Here again, the design and particularly the connection, becomes complicated and the aesthetic variations remain limited.

In fact, in order to have the greatest possible freedom as regards decoration of the dial, both for observation during the day and at night, it is preferable to have indirect lighting from the flange.

Numerous devices using one or more diodes, which may or may not be associated with a light guide, have been proposed. By way of example, U.S. Pat. Nos. 4,705,407 and 4,908,739 and European Patent No. 0 860 755 may be cited, which disclose various forms or structures of rigid annular guides made of PMMA intended to concentrate the light as much as possible on the dial and to provide uniform lighting. Use has however shown that it is very difficult, even impossible, to have truly uniform lighting.

SUMMARY OF THE INVENTION

The object of the invention is to overcome the drawbacks of the aforecited prior art by providing a lighting device using an electroluminescent lamp in the shape of a strip which is easy to set in place and connect to the excitation circuit.

The invention therefore concerns a peripheral lighting devices for the scale of a dial of an apparatus of small dimensions including a case in which are housed a movement driving at least one hand with respect to the scale, a power source and an electronic circuit able to supply a pulsed voltage, said case being closed by crystal extended on the dial side by an annular extension forming a flange, characterised in that a circular recess is provided inside the base of the flange to accommodate on the one hand, an electroluminescent ring formed of a strip having a border extending beyond the base and a connecting lug, and on the other hand a ring made of translucent plastic material forced into the annular recess to hold the electroluminescent ring at the bottom thereof.

BRIEF DESCRIPTIONS OF THE FIGURES

Other features and advantages of the invention will appear upon reading the description of a chronograph watch taken by way of example, with reference to the annexed drawings, in which:

FIG. 1 is a top view of a chronograph watch;

FIG. 3 is an enlarged view of the contact zone of the electroluminescent ring along the arrow III of FIG. 2;

FIG. 4 is an enlarged view of the electroluminescent ring assembly at any point along its periphery;

FIG. 5 shows, in enlarged perspective, the portion of electroluminescent ring at the connecting lug.

DETAILED DESCRIPTION OF THE EMBODIMENTS OF ILLUSTRATING THE INVENTION

Figure 2:
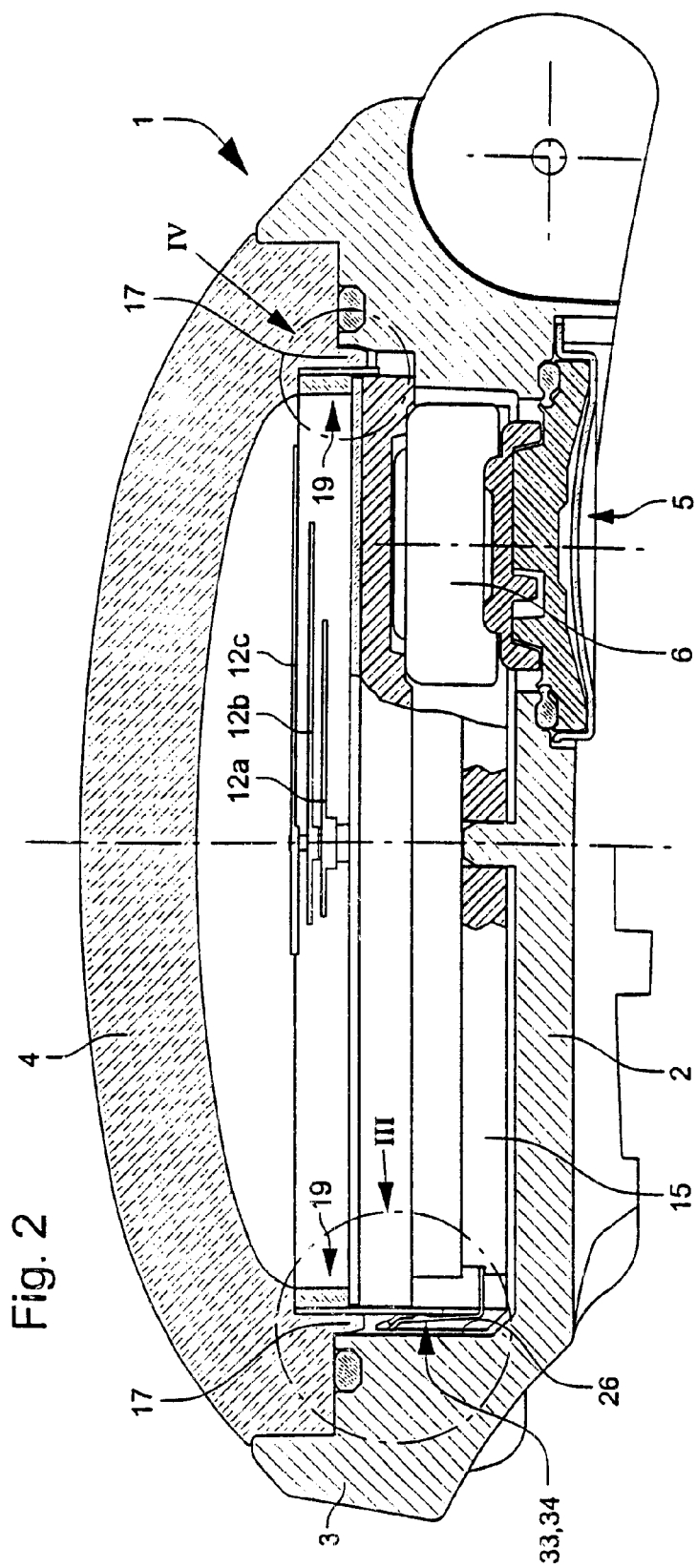
FIG. 2 is a cross-section along the line II—II of FIG. 1.

FIGS. 1 and 2 show a chronograph watch which includes, in a conventional manner, an exterior formed by a case 1, including a back cover 2 and a middle part 3 in a single piece, closed at its top part by a crystal 4.

The back cover includes a hatch 5 allowing the power source 6, formed by a button type battery, to be replaced.

The middle part includes a crown 7 and two push-buttons 8, 9 used in a conventional manner for setting the time and operating the chronograph, and a third push-button 10 allowing the lighting device to be activated for reading the time at night. It is clear that, for a watch without a chronograph function, one would need only one crown and a single push-button, or only one crown-push button given that mechanisms exist which enable both functions to be achieved by means of a single control member. Inside the case there is a chronograph movement 14 allowing the centre hands 12a, 12b, 12c and the counter hands 13a, 13b, 13c to be driven above a dial 11.

The chronograph movement is preferably an electronic movement powered by the button type battery.

Case 1 also contains an electronic circuit 15 connected both to power source 6 and to contact strip 33, 34 which will allow contact to be established with an electroluminescent ring 20 simply when they are asembled.

With reference to FIGS. 2 to 4 and 6, it can be seen that crystal 4 which is domed, has, in the part thereof turned towards the dial, an annular extension forming a flange 17.

Flange 17 includes at its base 18 a small annular shoulder 16 and an annular recess 19 which is substantially rectangular and open towards the inside of case 1.

Annular recess 19 includes against its wall 19a, and over its entire periphery, an electroluminescent ring 20 and a ring 30. Ring 20 is obtained by cutting, in an electroluminescent sheet such as those which are available on the market from the Lumitec company (Gais, Switzerland), a strip having substantially the length of the perimeter of recess 19, measured along its wall 19a. The width of the strip must be slightly greater than the height of recess 19 to form a small border 21 whose function will be explained hereinafter. A lug 22, perpendicular to the strip, is provided at any point of ring 20 to assure connection. In the example shown this lug 22 is arranged at ¼ of the length, so as to be able to establish the electric connection at the time position 9 o'clock, where there is no crown or push-button, and to have the junction of the two ends of the strip at the 6 o'clock position, which is less visible in the case of a wristwatch.

This lug 22, shown in more detail in FIG. 5, includes two contact areas 23, 24 formed by conductive paths of the electroluminescent sheet. These contact areas 23, 24 are made during manufacturing of an electroluminescent sheet, including a plurality of forms having the developed shape of ring 20, by omitting the structuring steps at lugs 22.

It can also be seen in FIG. 5 that by bending the ring-shaped strip, lug 22 is made rigid, but along a significant radius of curvature which is not likely to damage contact areas 23, 24 and thus without it being necessary to protect them with a conductive paint.

Figure 6:
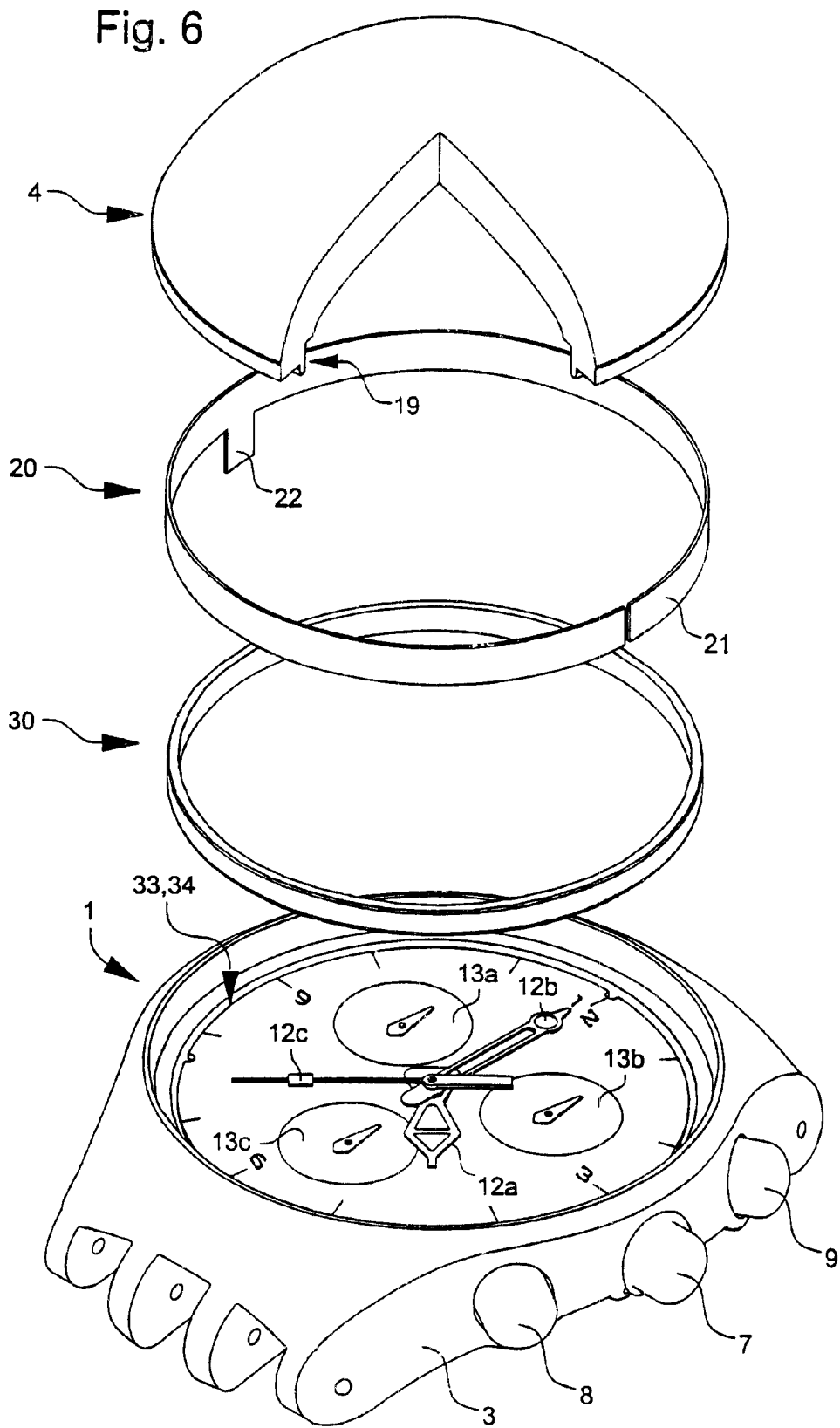
FIG. 6 is a blown up perspective view showing the method for assembling the lighting device in a watch.

After setting ring 20 in place, having previously turned crystal 4 over, this operation being represented by arrow 1 in FIG. 6, it is blocked by means of ring 30 made of translucent plastic material, this operation being represented by arrow 2. In order to facilitate the setting in place of ring 20, particularly when the assembly operations are automated, ring 30 initially has an oval pre-shape, and in the example shown a rectangular cross-section. With reference more particularly to FIGS. 3 and 4, it can be seen that the thickness of ring 30 is such that it is flush with the angle of junction with crystal 4 and its height is slightly less than the depth of annular recess 19.

Once ring 20 is blocked by ring 30, the crystal can be handled and turned over to fit it onto case 1, this operation being represented by arrow 3 in FIG. 6.

As is seen in FIGS. 3, 4 and 6, between dial 11 and inner wall 26 of middle part 3 a circular passage 27 is provided in which small annular shoulder 16 of the crystal will engage, border 21 of ring 20, and connecting lug 22 whose contact areas 23, 24 will engage between contact strips 33, 34 connected to electronic circuit 15 provided to supply a pulsed voltage when pressure is exerted on push-button 10.

The construction according to the invention which has just been described is thus easy to implement and can be adapted by those skilled in the art to a large number of products, without departing from the scope of the invention. It has the advantage of allowing maximum freedom as regards decoration and, by the choice of the electroluminescent sheet and the pulsed voltage, allowing the colour and the lighting zone to be varied from the width of the ring where the time symbols are arranged up to the whole of the dial.

What is claimed is:

1. A peripheral lighting device for illuminating the whole surface of a dial of a timepiece including a case in which are housed a movement driving at least one hand with respect to a scale, a power source and an electronic circuit able to supply a pulsed voltage, said case being closed by a crystal extended on the dial side by an annular extension forming a flange, wherein a circular recess having an open bottom and a wall is provided inside the flange to accommodate on the one hand, an electro luminescent ring formed of a strip having a connecting lug, and on the other hand a holding ring made of translucent plastic material forced into the annular recess to hold the electro luminescent ring at the bottom of the recess.

2. A peripheral lighting device according to claim 1, wherein the holding ring has an oval pre-shape so as to facilitate the setting in place thereof.

3. A peripheral lighting device according to claim 2, wherein the holding ring has a regular rectangular cross-section adapted to the annular recess.

4. A lighting device according to claim 1, wherein the translucent plastic material forming the holding ring is made of polymethylmethacrylate (PMMA).

5. A peripheral lighting device according to claim 1, wherein the bottom of the annular recess is arranged to leave free a passage for a connecting lug towards elastic contact strips connected to the electronic circuit and to grip the border against the wall of the annular recess.

* * * * *